H. H. Monroe,
Revolving Harrow.

No. 100,547. Patented Mar. 8, 1870.

Witnesses. Haley H. Monroe
Per Burke, Fraser & Osgood
att'ys

United States Patent Office.

HALSEY H. MONROE, OF THOMASTON, MAINE.

Letters Patent No. 100,547, dated March 8, 1870.

IMPROVEMENT IN REVOLVING HARROW

The Schedule referred to in these Letters Patent and making part of the same.

*To all whom it may concern:*

Be it known that I, HALSEY H. MONROE, of Thomaston, in the county of Knox, and State of Maine, have invented certain new and useful Improvements in Revolving Harrows; and I do hereby declare the following to be a full, clear, and exact description of the same, reference being had to the accompanying drawings making part of this specification, in which—

Figure 1:
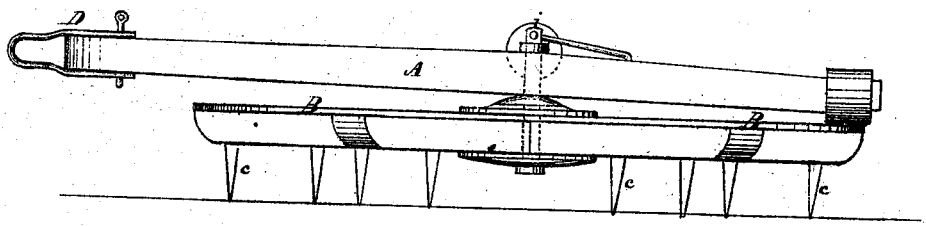

Figure 1 is a side elevation, and

Figure 2:
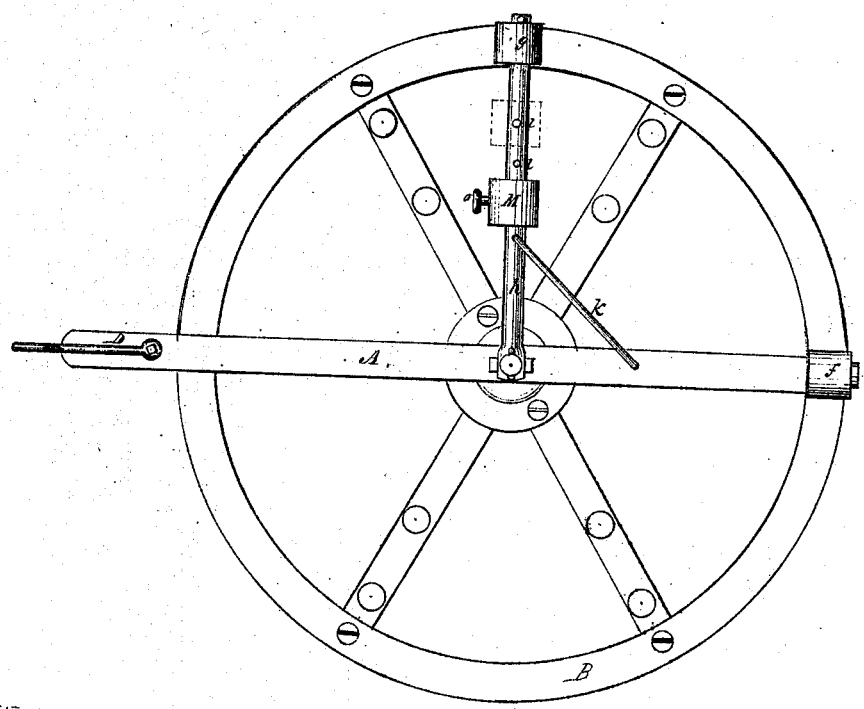

Figure 2, a top or plan view of a revolving harrow, showing my improvement applied thereto.

My invention relates to that class of harrows in which the revolving motion is produced by a weight resting on one side; and It consists in the employment of a sliding or adjustable weight upon an arm projecting laterally from the draft-beam, by moving which, toward or from the center or axis, the rotation of the harrow is regulated to adapt it to different soils, some of which, from their stiffness, require the effect of greater weight to cause the harrow to revolve than those which are looser, and allow the teeth to penetrate freely and to a greater depth.

As represented in the drawings—

A is the draft-beam;

B, the rim of the harrow-frame; and c c, the teeth.

The beam is provided with the usual clevis, D, or other mode of attaching the whiffletree, and is connected with the hub of the frame by a loose joint, which admits of vertical motion, so that the friction-wheel *f*, at its rear extremity, always bears upon the rim, and yet admits of some play in passing over uneven surfaces of ground.

Pivoted to the journal *i* is an arm, *h*, projecting laterally a distance equal to the radius of the harrow-rim, which is also provided at its extremity with a friction-wheel, *g*, which bears upon the rim B.

This arm is ordinarily placed at right angles to the direction of the beam A, and held by the brace *k*, but it may be fixed obliquely thereto by adjusting the end of the brace in different holes, *l l*, made to receive it.

Mounted upon the arm *h* in any suitable manner is a weight, M, which is held by a set-screw, *o*, by loosening which the weight may be made to slide toward or from the axis, thereby changing the load to any part between the center and the periphery of the harrow, as the nature of the soil may require.

In firm or stiff soils, in which the teeth do not readily penetrate, the weight is required to be located at the extremity of the arm to make the harrow revolve properly, but in mellow soil it requires to be adjusted inwardly toward the center, which is accomplished with the utmost facility by my device, enabling the operator to regulate the action of the harrow with the precision of a steam-engine governor.

My improvement is readily applied to revolving harrows already in use by a moderate amount of mechanical skill.

What I claim as my invention is—

The improved regulator for revolving harrows, consisting of the weight M, sliding upon the arm *h*, or its equivalent, substantially as and for the purpose set forth.

HALSEY H. MONROE.

Witnesses:
KATE N. JONES,
J. FRASER.